US012447540B2

(12) United States Patent
Fäldt et al.

(10) Patent No.: US 12,447,540 B2
(45) Date of Patent: Oct. 21, 2025

(54) AERONAUTICAL COMPONENT MACHINING

(71) Applicant: GKN Aerospace Sweden AB, Trollhättan (SE)

(72) Inventors: Daniel Fäldt, Trollhättan (SE); Niclas Dahlström, Trollhättan (SE); Henrik Högström, Trollhättan (SE); Fredrik Johansson, Trollhättan (SE)

(73) Assignee: GKN Aerospace Sweden AB, Trollhättan (SE)

( * ) Notice: Subject to any disclaimer, the term of this patent is extended or adjusted under 35 U.S.C. 154(b) by 821 days.

(21) Appl. No.: 17/607,076

(22) PCT Filed: May 26, 2020

(86) PCT No.: PCT/EP2020/064575
§ 371 (c)(1),
(2) Date: Oct. 28, 2021

(87) PCT Pub. No.: WO2020/239765
PCT Pub. Date: Dec. 3, 2020

(65) Prior Publication Data
US 2022/0193800 A1 Jun. 23, 2022

(30) Foreign Application Priority Data

May 28, 2019 (GB) ..................... 1907516

(51) Int. Cl.
*B23B 27/10* (2006.01)
*B23B 27/16* (2006.01)
(Continued)

(52) U.S. Cl.
CPC .............. *B23D 13/02* (2013.01); *B23B 27/10* (2013.01); *B23B 27/1666* (2013.01);
(Continued)

(58) Field of Classification Search
CPC ... B23B 27/10; B23B 27/1666; B23B 29/043; B23B 2250/12; B23B 27/16;
(Continued)

(56) References Cited

U.S. PATENT DOCUMENTS 9,925,596 B2* 3/2018 Johansson ............... B23B 27/10
2009/0311055 A1* 12/2009 Galota ...................... B23C 5/28
407/53

(Continued)

FOREIGN PATENT DOCUMENTS

CN 202 137 436 U 2/2012
EP 0088807 A1 9/1983
(Continued)

OTHER PUBLICATIONS

International Search Report and Written Opinion for PCT/EP2020/064575 mailed Sep. 7, 2020.
(Continued)

*Primary Examiner* — Sara Addisu
(74) *Attorney, Agent, or Firm* — Sheppard Mullin Richter & Hampton LLP

(57) ABSTRACT

An apparatus and corresponding method for machining at least one spline in an aeronautical component. The apparatus comprises a holder defining an axial direction about which the holder is moveable, and a cutting insert attachable to the holder. The apparatus further comprises a coupling for attaching the cutting insert to the holder about a second direction that is perpendicular to the axial direction of the holder. The holder may comprise a first alignment feature for orientating the cutting insert at a single orientation with respect to the holder. The cutting insert may comprise at least one cutting tooth, wherein each cutting tooth comprises (Continued)

a cutting edge. The cutting insert may comprise a first datum surface which is spaced from each cutting edge by a respective predetermined spacing.

16 Claims, 5 Drawing Sheets

(51) Int. Cl.
    *B23B 29/04*     (2006.01)
    *B23C 5/08*     (2006.01)
    *B23C 5/22*     (2006.01)
    *B23C 5/28*     (2006.01)
    *B23D 3/02*     (2006.01)
    *B23D 13/02*     (2006.01)

(52) U.S. Cl.
    CPC .............. *B23B 29/043* (2013.01); *B23C 5/22* (2013.01); *B23C 5/283* (2022.02); *B23D 3/02* (2013.01); *B23B 2215/04* (2013.01); *B23B 2250/12* (2013.01)

(58) Field of Classification Search
    CPC ....... B23B 2215/04; B23C 5/22; B23C 5/283; B23F 5/12; B23F 21/046; B23F 21/00; B23D 13/02; B23D 3/02
    See application file for complete search history.

(56) References Cited

U.S. PATENT DOCUMENTS

| | | | |
|---|---|---|---|
| 2010/0239377 A1* | 9/2010 | Morrison | B23C 5/28 407/42 |
| 2010/0272529 A1* | 10/2010 | Rozzi | B23C 5/28 408/56 |
| 2010/0322722 A1* | 12/2010 | Lin | B23B 31/1075 407/101 |
| 2011/0081211 A1 | 4/2011 | Frecska et al. | |
| 2011/0217131 A1* | 9/2011 | Bonnarang | B23C 5/28 409/64 |
| 2015/0132074 A1* | 5/2015 | Boissonnet | B23B 27/1625 407/11 |
| 2016/0236281 A1* | 8/2016 | Kitagawa | B23B 27/10 |
| 2018/0250753 A1* | 9/2018 | Frank | B23C 5/28 |
| 2019/0009344 A1* | 1/2019 | Poy | B23B 27/10 |
| 2019/0030613 A1* | 1/2019 | Larsson | B23B 27/1662 |
| 2019/0076944 A1 | 3/2019 | Wurfel | |
| 2020/0038962 A1* | 2/2020 | Kobayashi | B23C 5/28 |
| 2021/0039173 A1* | 2/2021 | Lof | B23B 27/10 |
| 2024/0109132 A1* | 4/2024 | Shamir | B23C 5/282 |
| 2024/0173777 A1* | 5/2024 | Imai | B23B 27/16 |
| 2024/0269755 A1* | 8/2024 | Deeg | B23B 51/066 |

FOREIGN PATENT DOCUMENTS

| | | | | |
|---|---|---|---|---|
| EP | 3539696 A1 | * | 9/2019 | ............ B23B 27/10 |
| JP | 09183002 A | * | 7/1997 | |
| JP | 10076404 A | * | 3/1998 | ............ B23B 27/10 |
| JP | 10094904 A | * | 4/1998 | |
| JP | 2011189448 A | | 9/2011 | |
| JP | 2016187837 A | | 11/2016 | |
| JP | 2018079824 A | | 5/2018 | |
| WO | 2019072696 A1 | | 4/2019 | |

OTHER PUBLICATIONS

JPO Notice of Reasons for Rejection for related application No. JP2021-569362 mailed Jun. 27, 2023 (9 pages; with English translation).

* cited by examiner

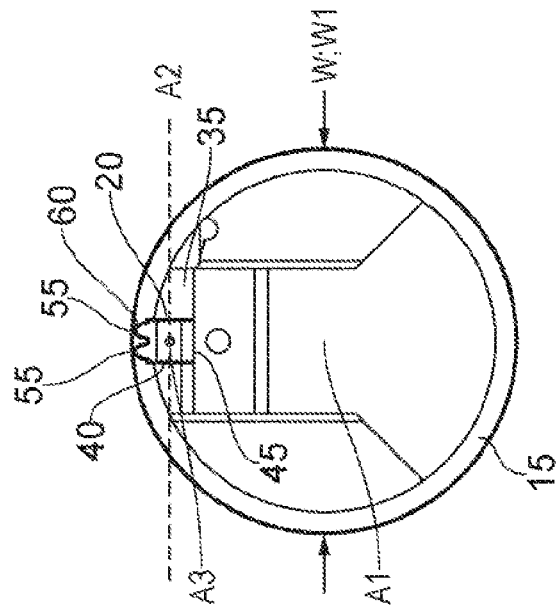
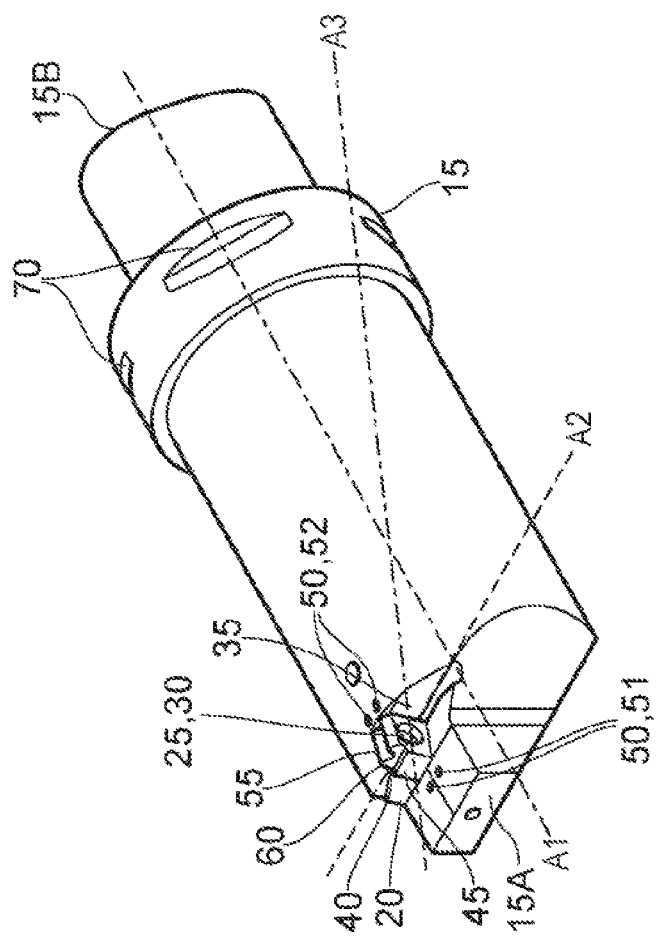
FIG. 2B
FIG. 2A

AERONAUTICAL COMPONENT MACHINING

CROSS-REFERENCE TO RELATED APPLICATIONS

This application is a national stage of, and claims priority to, Patent Cooperation Treaty Application No. PCT/EP2020/064575, filed on May 26, 2020, which application claims priority to Great Britain Application No. GB 1907516.7, filed on May 28, 2019, which applications are hereby incorporated herein by reference in their entireties.

BACKGROUND

In the context of forming splines in an aeronautical component, such as a gear or other meshing component, the dimensional tolerances required by these splines are narrow. In that regard, the dimensional tolerances should at least be within the narrow tolerances allowed for by Class 4 from ANSI B92.1. To meet these narrow dimensional tolerances, it is presently the case that splines in an aeronautical component are formed using bespoke gear shaping and/or gear hobbing machines. Whilst these machines are able to form the splines to relatively narrow tolerances set out above, these machines are relatively slow, and are also expensive.

A further disadvantage of using these machines is that they are unable to perform edge breaking on the splines which are formed, which is where the edges of the splines are filleted/chamfered to remove any sharp edges. As a result, any formed splines using these machines must be post-processed on a separate machine to perform the edge breaking step.

Disclosed herein is a fundamentally different way to produce such splined aeronautical components, which avoid the use of gear shaping and gear hobbing machines and which enables complex and accurate splines to be formed.

SUMMARY

Viewed from a first aspect of there is provided an apparatus for machining at least one spline in an aeronautical component, the apparatus comprising a holder defining an axial direction about which the holder is moveable, and a cutting insert attachable to the holder, wherein the apparatus further comprises a coupling for attaching the cutting insert to the holder about a second direction that is perpendicular to the axial direction of the holder.

By attaching the cutting insert to the holder about the second direction that is perpendicular to the axial direction of the holder, this has been found to allow the cutting insert to make cuts to finer tolerances, due to this alignment making it less likely that the cutting insert will become loose, and thus, move with respect to the holder during use of the apparatus (noting such movements of the cutting insert will reduce the accuracy of its generated cuts). In view of this capability of the cutting insert to cut to finer tolerances, this has made the apparatus suitable for use in machining a spline in an aeronautical component.

In accordance with some examples, the cutting insert may comprise at least one cutting tooth, wherein each cutting tooth comprises a cutting edge; wherein the cutting insert comprises a first datum surface which is spaced from each cutting edge by a respective predetermined spacing. In such examples, the first datum surface (which may comprise one or more first datum points) may be thus configured for better ensuring the correct position of each cutting edge on the apparatus prior to its use in machining the at least one spline in the aeronautical component. In that respect, by determining at least one position of the first datum surface from the cutting insert with respect to a predetermined reference position; and then compensating for a difference in the at least one position of the first datum surface with respect to the predetermined reference position, this allows the first datum surface (and thus each cutting edge) to be positioned and orientated at a more correct position, with respect to the component, prior to any machining of the splines(s) in the component. In that way, the provision of the first datum surface thus facilities improved placement of each cutting edge with respect to the component being machined, which in the context of forming splines within the narrow tolerances allowed for by Class 4 from ANSI B92.1, is beneficial.

In such examples where the first datum surface is present, in some particular examples thereof, the first datum surface may comprise an external flat surface on the cutting insert.

To further improve the accuracy in being able to determine the position of the first datum surface from the cutting insert with respect to the predetermined reference position, in accordance with some examples the first datum surface may be polished.

In some examples, the coupling comprises a slot extending in the second direction, and which extends through one of the cutting insert and the holder; and an elongate member connected to the other of the cutting insert and the holder, wherein the elongate member is passable in the second direction through the slot for attaching the cutting insert to the holder. The presence of the slot, which may in some examples have a cylindrical or circular cross section, along with the elongate member (such as a bolt or screw) whose elongate axis is parallel to the second direction provides a particularly convenient and effective coupling between the cutting insert and the holder.

In some examples, at least one of the cutting insert and the holder comprises a first alignment feature for orientating the cutting insert at a single orientation with respect to the holder. By ensuring the cutting insert is inserted at a single orientation with respect to the holder, this also mitigates against manufacturing errors caused by the cutting insert being inserted incorrectly, i.e., at an incorrect orientation with respect to the holder. In some examples, the first alignment feature may be operable to ensure that for a given cutting insert (or, vice versa, holder), said cutting insert (holder) can be used and suitably aligned with a plurality of different holders (cutting inserts) having different shapes and sizes. By providing this mitigation against such manufacturing errors and misalignments, the apparatus is even more effective for use in machining at least one spline in an aeronautical component, where manufacturing tolerances are narrow.

Where the first alignment feature is present, the first alignment feature may comprise a recess, in the holder, and in which the cutting insert is located when the cutting insert is attached to the holder.

The first alignment feature may comprise a first shoulder on the holder, wherein the cutting insert is located against the first shoulder when the cutting insert is attached to the holder. In such examples, the first alignment feature may comprise a second shoulder on the holder, wherein the cutting insert is located against the second shoulder when the cutting insert is attached to the holder, and wherein the second shoulder is perpendicular to the first shoulder.

In the above instances, each shoulder and/or the provision of the recess from the first alignment feature each help to mitigate against the cutting insert being inserted/misaligned incorrectly, which therefore facilities the apparatus at machining splines to the standards required for aeronautical components.

In some examples, the holder may comprise a plurality of coolant outlets for the passage of coolant fluid from the holder towards the aeronautical component, wherein the cutting insert when attached to the holder via the coupling is positioned between a first coolant outlet and a second coolant outlet from the plurality of coolant outlets. By situating the coolant outlets on either side of the cutting insert, this better ensures the workpiece/machined component (particularly those made of Titanium, which is commonly used in the aeronautical industry) and the cutting insert are kept at the correct temperature whilst the component is being machined, and also ensures that any generated swarf is effectively passed away from the area which is being machined. Together, these technical effects help better ensure the machined component can be manufactured to the tolerances required for aeronautical components.

The cutting insert may comprise at least one cutting tooth, and in some examples the at least one cutting tooth comprises a plurality of cutting teeth. The number of cutting teeth provided on the cutting insert may vary depending on the component being machined, and also the strength of the machined component to withstand machining from more than one tooth simultaneously. In that regard, where more than one tooth is present, this nominally allows for the creation of multiple splines simultaneously, which thus allows for the aeronautical component to be manufactured more quickly. Where more than one tooth is present, in some examples each tooth may have a different shape, since this nominally allows for the creation of splines having particularly complex geometry. In some examples, the presence of more than one cutting tooth on the cutting insert may provide the possibility of allowing a different tooth to be used at different times during the machining process, for instance by allowing one tooth to be cooled whilst the other tooth is being used, which may further assist with ensuring a given machined component can be manufactured to the tolerances required for aeronautical applications.

Each cutting tooth may comprise a cutting edge extending along a length direction of the cutting insert, wherein the second direction is perpendicular to the length direction of the cutting insert.

For each cutting tooth present on the cutting insert, it is envisaged in some examples that the cutting tooth may be machined into the cutting insert. Such machining may comprise, in some particular examples, at least one of punching, pressing, and/or cutting the cutting insert to machine each cutting tooth into the cutting insert.

The holder may comprise a first axial end, and a second axial end opposite the first axial end, wherein the cutting insert when attached to the holder is located between the first axial end and the second axial end. Locating the cutting insert between the first axial end and the second axial end of the holder is particularly unconventional, but has been found to make it easier to feed coolant to any coolant outlets located on either side of the cutting insert.

In such examples, the holder may comprise a narrowing portion extending from the first axial end towards the second axial end, wherein the maximum width of the holder in the narrowing portion decreases from the second axial end towards the first axial end, and wherein the cutting insert when attached to the holder is located in the narrowing portion of the holder, wherein the width direction of the holder is perpendicular to the axial direction of the holder. By locating the cutting insert in the narrowing portion, this better allows the cutting insert to machine smaller parts, and within tighter spaces, from the component being machined (e.g., on the inside of a component).

The apparatus may further comprise a rotatable member which is attached to holder, wherein the rotatable member is rotatable about a first axis of rotation, and rotatable about a second axis of rotation which is not parallel to the first axis of rotation. In such examples, the apparatus may further comprise a second alignment feature between the rotatable member and the holder for orientating the holder at a single orientation with respect to the rotatable member. The presence of each rotatable member allows the cutting insert to be more easily orientated with respect to the component being machined, such that the cutting insert can more easily create the shape of each required spline.

In some examples, the apparatus may be configured to allow the cutting insert, when attached to the holder, to be moved about at least one of 4, 5, or 6 axes of movement. For five axes of movement, these axes may include movement in a Cartesian coordinate system, e.g. movement about perpendicular X, Y and Z linear axes, and also rotational movement about first and second rotational axes which are not parallel to each other. Conveniently, the provision of these 5 axes of movement allows the cutting insert to approach the workpiece from any direction, such that a given spline can be more easily created using the apparatus. For 6 axes of movement, in some examples there may be provided an additional third rotational axis, which is not parallel to either of the first or second rotational axes.

The apparatus may further comprise the cutting insert attached to the holder via the coupling.

In some examples, the cutting insert may be a CBN cutting insert.

Viewed from a second aspect there is provided an apparatus for machining at least one spline in an aeronautical component, the apparatus comprising a holder, and a cutting insert attachable to the holder, wherein the apparatus further comprises a coupling for attaching the cutting insert to the holder, wherein the holder comprises a first alignment feature for orientating the cutting insert at a single orientation with respect to the holder. As noted above, ensuring the cutting insert is inserted at a single orientation with respect to the holder mitigates against manufacturing errors caused by the cutting insert being inserted incorrectly, which helps ensure the machined component can be manufactured to the tolerances required in aeronautical applications.

In accordance with some examples, and as noted above, the cutting insert may comprise at least one cutting tooth, wherein each cutting tooth comprises a cutting edge; wherein the cutting insert comprises a first datum surface which is spaced from each cutting edge by a respective predetermined spacing. In such examples, the first datum surface (which may comprise one or more first datum points) may be thus configured to ensure a more correct positioning of each cutting edge on the apparatus prior to its use in machining the at least one spline in the aeronautical component.

In some examples, each of the above apparatus may specifically be a spline machining apparatus.

Viewed from a third aspect there is provided a cutting insert for machining at least one spline in an aeronautical component, the cutting insert comprising at least one cutting tooth, each cutting tooth comprising a cutting edge extending along a length direction of the cutting insert, wherein the cutting insert comprises at least one coupling extending about a width direction of the cutting insert, wherein the width direction is perpendicular to the length direction, wherein the coupling is configured to releasably attach the cutting insert to an apparatus for holding, and moving, the cutting insert for machining the at least one spline in the aeronautical component.

In accordance with some examples, each cutting tooth may comprise a cutting edge; wherein the cutting insert comprises a first datum surface which is spaced from each cutting edge by a respective predetermined spacing. In such examples, and as noted previously, the first datum surface may be used for better ensuring the correct position of each cutting edge prior to its use in machining at least one spline in a component. In that respect, it may be then possible to determine at least one position of the first datum surface from the cutting insert with respect to a predetermined reference position; and then compensate for a difference in the at least one position of the first datum surface with respect to the predetermined reference position, such to ensure the first datum surface (and thus each cutting edge) is positioned and orientated at a more correct position prior to any machining of the splines(s) in the component.

In the above examples where the cutting insert comprises the first datum surface, in accordance with some examples thereof, there may be provided a method, comprising the cutting insert, and a holder from an apparatus for holding, and moving, the cutting insert for machining at least one spline in an aeronautical component; wherein the method comprises:

attaching the cutting insert to the holder;
determining at least one position of the first datum surface from the cutting insert with respect to a predetermined reference position; and
compensating for a difference in the at least one position of the first datum surface with respect to the predetermined reference position.

In the above method, in accordance with some examples, the compensating for a difference in the at least one position of the first datum surface with respect to the predetermined reference position may comprise adjusting the position of the apparatus and the cutting insert with respect to the aeronautical component.

In some examples, such adjusting the position of the apparatus and the cutting insert with respect to the aeronautical component may comprise moving one of the apparatus and the aeronautical component, but not the other of the apparatus and the aeronautical component.

In the above methods, once the compensating for a difference in the at least one position of the first datum surface with respect to the predetermined reference position has been performed, as required, the method in some examples may then further comprise moving the apparatus, comprising the cutting insert attached to the holder, with respect to the component to cut a first portion of material from the component using the at least cutting tooth to create the at least one spline in the aeronautical component.

Viewed from a fourth aspect there is provided a method of machining at least one spline in an aeronautical component using an apparatus according to first or second aspects.

Viewed from a fifth herein there is provided a method of machining at least one spline in an aeronautical component using the cutting insert of the third aspect.

Viewed from a sixth aspect there is provided a method of machining at least one spline in an aeronautical component using an apparatus comprising a holder, and a cutting insert attached to the holder, wherein the cutting insert comprises at least one cutting tooth for cutting material from the aeronautical component, wherein the method comprises:

moving the apparatus with respect to the aeronautical component to cut a first portion of material from the aeronautical component using the at least cutting tooth to create the at least one spline; and moving the apparatus with respect to the aeronautical component and cutting a second portion of material from the aeronautical component to create a fillet or chamfer on an edge from the at least one spline.

In the above method, both the creation of the at least one spline and the subsequent edge breaking performed on each spline are done in the same operation, which makes the manufacturing process of the component quicker, and reduces manufacturing errors caused by the component being held in different positions (and thus machined differently) where the above steps are performed on the different apparatuses.

In some examples of the above methods, the edge breaking performed on each spline may be performed by an edge breaking tool from the apparatus. In some particular examples, the edge breaking tool may be separate from the cutting insert.

In some examples of the above methods, the at least one spline may be an internal spline, or an external spline, in the aeronautical component. Given the nature of the apparatus, the machine may be suited at creating any number and combination of internal and/or external splines from a given component.

In some examples, the at least one spline may comprise a plurality of splines extending around a circumference of the aeronautical component, wherein the moving the apparatus with respect to the aeronautical component to cut a first portion of material from the aeronautical component using the at least cutting tooth to create the at least one spline further comprises:

cutting the aeronautical component using the at least cutting tooth to create a first spline from the plurality of splines; and
cutting the aeronautical component using the at least cutting tooth to create a second spline from the plurality of splines;
cutting the aeronautical component using the at least cutting tooth to create a third spline from the plurality of splines;
wherein the third spline from the plurality of splines is positioned between the first spline and the second spline, and is created after the creation of the first spline and the second spline.

By not creating the second spline straight after the first spline, this allows for a more equal distribution of temperatures in the component as it is machined, and has been found to be a more effective way of creating splines to the required tolerances—particularly in components that are particularly thin walled and slender, versus a corresponding component whose neighbouring splines are created consecutively.

Viewed from a seventh aspect there is provided a spline forming apparatus comprising a tool holder for a multi-axis cutting machine, said tool holder comprising a coupling arranged in use to receive a cutting insert, wherein the cutting insert has a cutting surface geometry corresponding to a desired spline geometry.

In some examples, the cutting insert may be provided with a cutting surface geometry corresponding to a pair of adjacent splines.

In some examples, the multi-axis cutting machine may be a 5 axis computer numerically controlled milling machine. Conveniently, the provision of these 5 axes of movement allows the cutting insert to approach a given workpiece from any direction, such that a given spline can be more easily formed using the spline forming apparatus.

Viewed from an eighth aspect there is provided a multi-axis milling machine comprising an apparatus as claimed in any example according to the seventh aspect.

Viewed from a ninth aspect there is provided a method of operating a multi-axis milling machine as claimed in the eighth aspect of the invention, said method comprising the steps of:
(A) reciprocating the tool holder and cutting insert along an axis of the machine to form one or more splines in a part to be machined;
(B) rotating the part to be machined with respect to the multi-axis milling machine by a predetermined angle; and
(C) repeating steps (A) and (B) until a predetermined number of splines have been formed around the part.

BRIEF DESCRIPTION OF THE DRAWINGS

One or more examples will now be described, by way of example only, and with reference to the following figures in which:

FIG. 2A shows a perspective view of holder and a cutting insert for use in the apparatus of FIG. 1;

FIG. 2B shows an end view of the holder and cutting insert from FIG. 2A, when viewed from a first axial end of the holder;

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to".

The various examples described herein are presented only to assist in understanding and teaching the claimed features. These examples are provided as a representative sample of examples only, and are not exhaustive and/or exclusive. It is to be understood that advantages, examples, functions, features, structures, and/or other aspects described herein are not to be considered limitations on the scope defined by the claims or limitations on equivalents to the claims, and that other examples may be utilised and modifications may be made without departing from the spirit and scope of the claimed invention. Various examples may suitably comprise, consist of, or consist essentially of, appropriate combinations of the disclosed elements, components, features, parts, steps, means, etc, other than those specifically described herein. Furthermore, it will be recognised that the features described herein can conveniently and interchangeably be used in any suitable combination.

DETAILED DESCRIPTION

Figure 1:
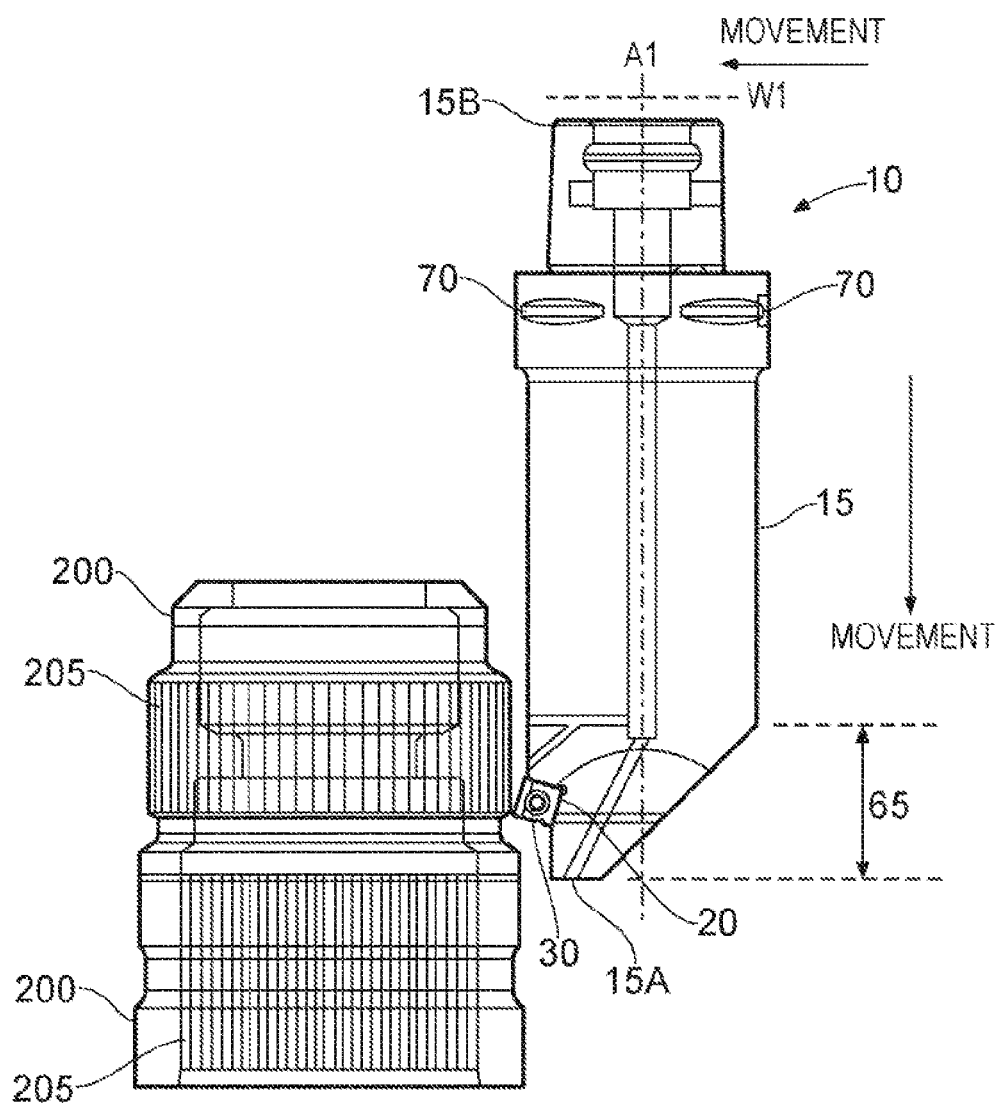
FIG. 1 shows a schematic of an apparatus for machining at least one spline in an aeronautical component.

With reference to FIGS. 1 and 2A-2B, there is shown an apparatus 10 for machining at least one spline 205 in an aeronautical component 200. The apparatus, which may specifically be a spline machining apparatus, comprises a holder 15 defining an axial direction A1 about which the holder 15 is moveable, and a cutting insert 20 attachable to the holder 15. In some examples, the cutting insert 20 may be a CBN cutting insert 20. The apparatus further comprises a coupling 25 for attaching the cutting insert 20 to the holder 15 about a second direction A2 that is perpendicular to the axial direction A1 of the holder 15.

In the example shown in FIGS. 1 and 2A-2B, the coupling 25 is shown as comprising a slot 30 extending in the second direction A2, and which extends through the cutting insert 20; and an elongate member (not shown in the Figures), defining an elongate axis, connected to the holder 15. In that way, the elongate member is passable in the second direction A2 through the slot 30 for attaching the cutting insert 20 to the holder 15, such that the elongate axis is parallel to the second direction A2. It will be appreciated that in other examples, the slot 30 may instead extend through the holder, with the elongate member connected to the cutting insert.

In one particular example, the slot 30 may take the form of a hole through which is received the elongate member, which may take the form of a screw or bolt which screws into a portion of the holder 15, such to affix the holder 15 between the head of the screw/bolt and the portion of the holder 15 in which the screw/bolt is screwed into. In such examples, the elongate axis of the screw/bolt is then parallel to the second direction A2.

To better align the cutting insert with respect to the holder, the holder 15 may comprise a first alignment feature for orientating the cutting insert 20 at a single orientation with respect to the holder 15. In some examples, the first alignment feature may comprise a recess 35, in the holder, and in which the cutting insert 20 is located when the cutting insert is attached to the holder 15. The first alignment feature may in some examples comprise a first shoulder 40 on the holder, wherein the cutting insert is located against the first shoulder when the cutting insert is attached to the holder. The first alignment feature may also comprise a second shoulder 45 on the holder, wherein the cutting insert is located against the second shoulder when the cutting insert is attached to the holder, and wherein the second shoulder 45 is perpendicular to the first shoulder 40.

To help ensure the component 200 and the cutting insert 20 are kept at the correct temperature whilst the component is being machined, the holder 15 in some examples may comprise a plurality of coolant outlets 50 for the passage of coolant fluid from the holder towards the aeronautical component, wherein the cutting insert 20 when attached to the holder 15 via the coupling is positioned between a first coolant outlet 51 and a second coolant outlet 52 from the plurality of coolant outlets 50.

Turning to the cutting insert 20, the cutting insert is shown as comprising at least one cutting tooth 55. In the example shown in FIGS. 2A-2B, the cutting insert 20 is shown as comprising a plurality of cutting teeth, namely two cutting teeth. Each cutting tooth 55 comprises a cutting edge 60 extending along a length direction A3 of the cutting insert, wherein the second direction A2 is perpendicular to the length direction A3 of the cutting insert.

In the examples shown in the Figures, the holder 15 is shown as comprising a first axial end 15A, and a second axial end 15B opposite the first axial end 15A. The cutting insert, when attached to the holder, is then located between the first axial end 15A and the second axial end 15B. In some particular examples, the holder 15 may comprise a narrowing portion 65 extending from the first axial end 15A towards the second axial end 15B, wherein the maximum width W of the holder in the narrowing portion decreases from the second axial end 15B towards the first axial end 15A. There, the width direction W1 of the holder is perpendicular to the axial direction of the holder A1. In such examples, the cutting insert when attached to the holder may also be located in the narrowing portion of the holder.

Figure 3C:
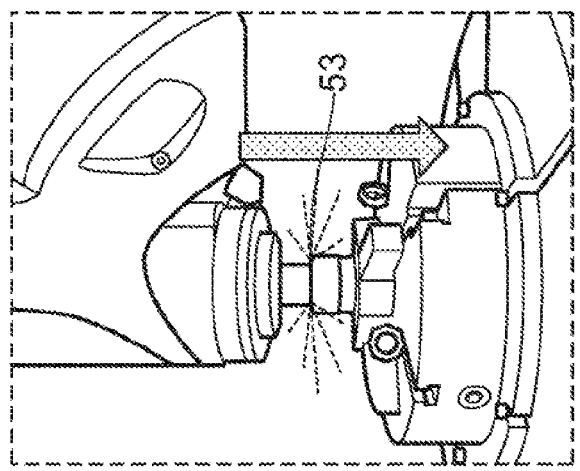
FIG. 3C shows the apparatus from FIG. 3A in a third position for machining the at least one spline in the aeronautical component.
Figure 3B:
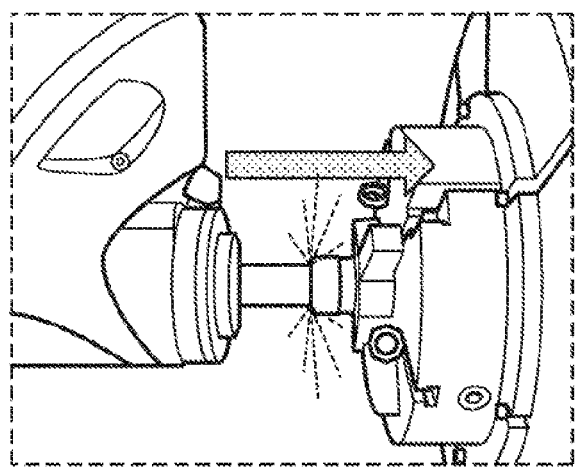
FIG. 3B shows the apparatus from FIG. 3A in a second position for machining the at least one spline in the aeronautical component.
Figure 3A:
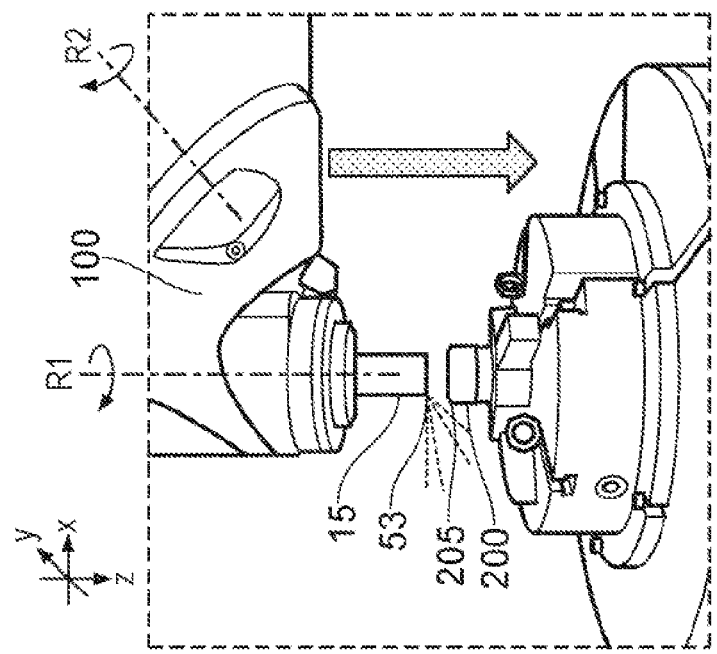
FIG. 3A shows an apparatus similar to that of FIG. 1 in a first position for machining at least one spline in an aeronautical component.

With reference to FIG. 3A-3C, the apparatus may further comprises a rotatable member 100 which is attached to the holder, wherein the rotatable member is rotatable about a first axis of rotation R1, and rotatable about a second axis of rotation R2 which is not parallel to the first axis of rotation R1. To assist with the attachment of the holder 15 to the rotatable member 100, a second alignment feature may be provided between the rotatable member 100 and the holder 15 for orientating the holder 15 at a single orientation with respect to the rotatable member 100. In the example of FIGS. 3A-3C, the second alignment feature is shown as two grooves 70 which each extend around a portion of the outer surface of the holder 15 which is located towards the second axial end 15B. There, the grooves 70 engage with respective projections in an inner surface of the rotatable member 100. It will be appreciated however, that the exact shape and positioning of the second alignment feature may be varied as required, so long as the rotatable member 100 and the holder 15 can be suitably orientated at a single orientation with respect to each other.

The rotatable member 100 is preferably configured to also move about a Cartesian coordinate system, e.g. movement about perpendicular X, Y and Z linear axes, as highlighted in FIG. 3A. With these additional three axes of movement, the apparatus from FIGS. 3A-3C is therefore configured to allow the cutting insert 20, when attached to the holder 15, to be moved about 5 axes of movement (namely translation movement about axes X, Y and Z, and rotational movement about axes R1 and R2). It will be appreciated that in other examples, there may be provided a different number of axes of movement (for instance, 4 or 6 axes of movement). This might be achieved by adding one or more further axes of movement to the apparatus, for instance by adding an additional third rotational axis, which is not parallel to either of the first or second rotational axes R1 and R2. Alternatively, in some examples, any number of X, Y and Z axes, and/or one or more of the rotational axes R1 or R2, may be removed to provide fewer than 5 axes of movement (e.g. removing one of the axes to provide 4 axes of movement).

In terms of the operation of the apparatuses described herein, an example operation is shown with respect to FIGS. 3A-3C, which shows the apparatus being used to create an internal spline 205 in an aeronautical component 200. To create the spline 205, a cutting insert 20, for instance a CBN cutting insert 20, is attached to the holder 15 via the coupling. In that regard, the positioning of the cutting insert 20 within the recess 35, and against the first and second shoulders 40; 45 from the holder 15, or in more general terms the positioning of the cutting insert 20 via the first alignment feature, ensures that the cutting insert 20 is positioned correctly and at the correct orientation with respect to the holder.

The holder 15 is then attached to the rotatable member 100 via the grooves 70 located toward the second axial end 15B of the holder 15. The alignment of the grooves 70 in the respective projections from the inner surface of the rotatable member 100 ensures that the holder 15 (and consequently the cutting insert 20) is correctly orientated with respect to the rotatable member 100 and the component being machined, which in the context of forming a spline in an aeronautical component is important, noting the narrow dimensional tolerances allowed for in such components.

The apparatus is then operated based on predetermined commands from a computer (not shown in the Figures), which is connected to and which operates the apparatus 10 to move it about its 5 axes of movement to create the spline 205 in the aeronautical component 200, which is located on a fixture during the machining process. In the case of the movement shown in FIGS. 3A-3C, the apparatus 10 is shown as principally moving about the z axis in a downward direction. As the apparatus 10 descends about this z axis, the cutting tool/insert 20 removes material from the inside of the aeronautical component 200, such to machine an internal spline into an inner surface of the aeronautical component 200.

Once the first spline 205 has been created, the apparatus 10 may then be moved based on commands from the computer to then create another spline 205 in the aeronautical component. This process may then be repeated, as required, to make the requisite number of splines in the aeronautical component.

As can be seen in FIGS. 3A-3C, during the operation of the apparatus 10, coolant fluid 53 passes out from the coolant outlets 50 to provide ample lubrication and a cooling action to the cutting tool and the aeronautical component being machined, which in the context of machining aeronautical components is important to help ensure the component is created within the permitted, narrow, dimensional tolerances.

In creating multiple splines in the aeronautical component, in some examples neighbouring splines from the aeronautical component are not machined sequentially. Instead, after the creation of a first spline, the next (second) created spline may be located some distance away from the created first spline, for instance diametrically opposed to the first spline on the aeronautical component. Upon creation of the second spline, a third spline may then be created which is more proximal to the first spline (possibly adjacent to the first spline) than the second spline is to the first spline. By not creating the second spline straight after the first spline, this allows for a more equal distribution of temperatures in the component as it is machined, and has been found to be a more effective way of creating splines to the required tolerances—particularly in components that are particularly thin walled and slender, versus a corresponding component whose neighbouring splines are created consecutively.

In some examples, to help create the splines 205 in the aeronautical component 200, a cutting surface geometry of the cutting insert 20 may correspond to a desired spline geometry of a spline 205, and/or correspond to a pair of adjacent splines 205, from the aeronautical component 200.

Once all the necessary splines 205 from the aeronautical component 200 have been machined/created using the cutting insert 20, the apparatus 10 may then be used to perform edge breaking on the splines 205, based on predetermined commands sent from the computer in communication with, and which controls, the apparatus 10. Once the edge breaking step has been completed, which may in some examples be performed using an edge breaking tool from the apparatus 10 (not shown in the Figures, and which may be separate from the cutting insert 20), and/or which may be performed using the cutting insert 20 from the apparatus 10, i.e. the necessary fillet(s) or chamfer(s) have been applied to edges of each spline, the aeronautical component 200 may then be removed from the fixture on which it is held.

Together therefore, the presence of the appropriately located coolant outlets relative to the cutting tool 20; the first and second alignment features; the coupling between the holder 15 and the cutting tool 20; and the sequence in which multiple splines are created; all contribute to the apparatus herein described being suitable for using a (CNC) machining process to machine splines into aeronautical components, and to within the narrow dimensional tolerances required for such components (for instance within the tolerances allowed for by Class 4 from ANSI B92.1).

Figure 4:
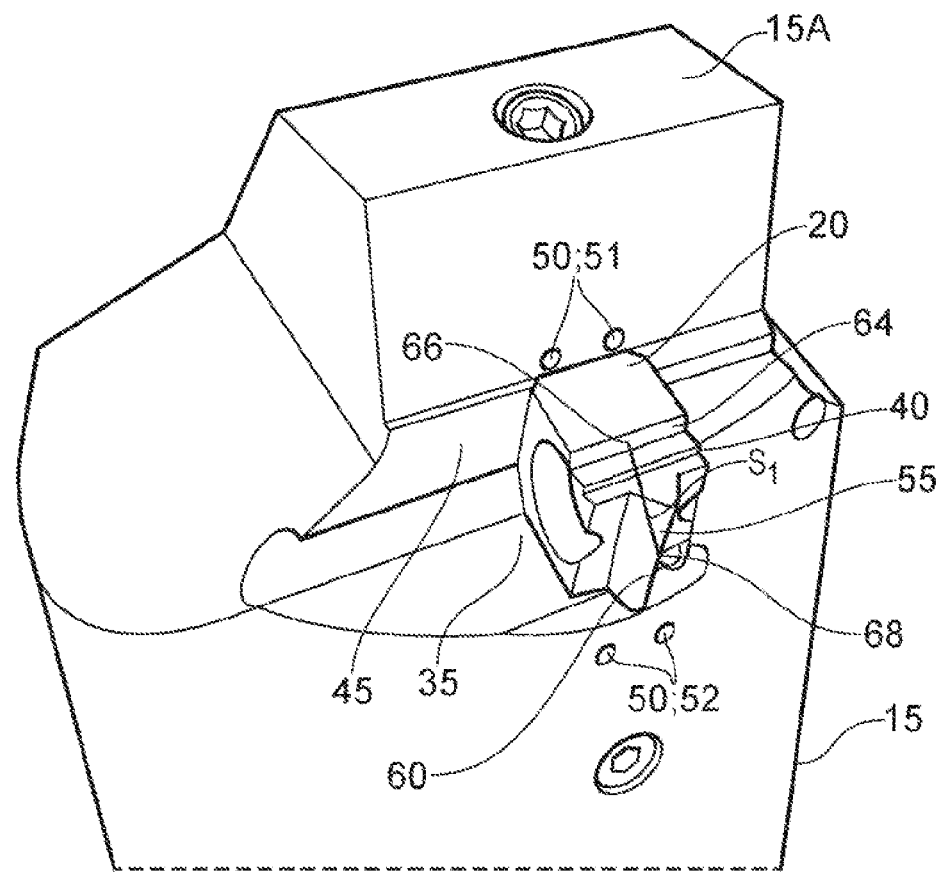
FIG. 4 shows a perspective view of a portion of a holder and a cutting insert for use in the apparatus of FIG. 1.

With reference to FIG. 4, in accordance with some examples, the cutting insert 20 may comprise a datum surface 64 which is spaced from each cutting edge 60 by a respective predetermined spacing $S_1$. In such examples, the first datum surface 64 as will be described is configured to be used for better ensuring the correct placement of each cutting edge 60 on the apparatus 10 during its use in machining at least one spline 205 in an aeronautical component 200. It is envisaged that in some examples, the first datum surface 64 may comprise one or more first datum points 66 from which the respective predetermined spacing $S_1$ may be based off. Such first datum points may comprise, for instance, a corner point of the first datum surface 64, or the centre point of the first datum surface 64. Similarly, it is envisaged that each cutting edge 60 may comprise one or more datum points 68 from which the respective predetermined spacing $S_1$ may be based off. Such one or more datum points 68 from the cutting edge 60 may comprise, for instance, a point at either end of the cutting edge 60, or a point at the centre of the cutting edge 60. In the particular example shown in FIG. 4, the predetermined spacing $S_1$ is shown as being the spacing between a first datum point 66 located at the centre of the first datum surface 64, and a second datum point 68 located at the centre of the cutting edge 60. Thus, in other words, the predetermined spacing $S_1$ can be defined as a predetermined vector which spans between a point/location from the first datum surface 64, and a point/location from the cutting edge 60. In this way, the position of each cutting edge 60 relative to the first datum surface 64 remains known, irrespective if the cutting edge 60 (and hence the first datum surface 64) is formed in an incorrect position and/or orientation during the machining process of the cutting insert 20, noting the first datum surface 64 and each cutting edge 60 will be formed as part of the same machining process in their creation in the cutting insert 20.

The first datum surface 64 (and any one or more first datum points 66 therefrom) may be used during the process for machining at least one spline 205 in an aeronautical component 200 to better ensure that each cutting edge 60 is located at the correct position relative to the component 200 being machined. In that respect, once the cutting insert 20 is attached to the holder 15, prior to any machining of the component 200, a methodology can then be provided which comprises determining at least one position $P_{1n}$ (e.g. $P_{1a}$; $P_{1b} \ldots P_{1n}$) of the first datum surface 64 from the cutting insert 20 with respect to a predetermined reference position $P_0$; and then compensating for a difference in the at least one position $P_{1n}$ of the first datum surface 64 with respect to the predetermined reference position $P_0$.

The predetermined reference position $P_0$ is configured to relate to a known spacing from a predetermined position $P_2$ from the component 200 that is to be machined. In some examples, the predetermined reference position $P_0$ may be related to a known, or 'zero' position on the coordinate system about which the cutting insert 20, when attached to the holder 15, can move, and from which the predetermined position $P_2$ from the component 200 is also derivable.

Figure 5:
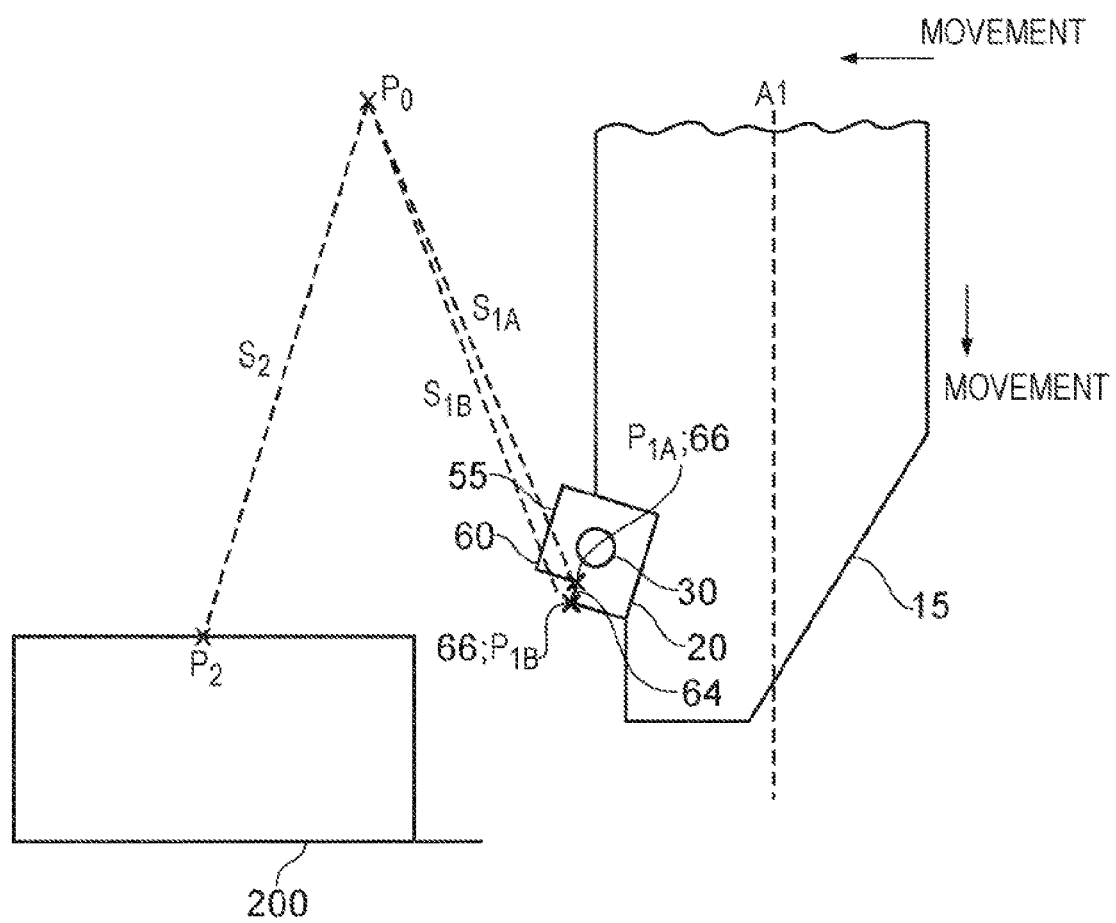
FIG. 5 shows a schematic view of a cutting insert comprising a first datum surface when used as part of a methodology for machining at least one spline in an aeronautical component.

In respect of the at least one position $P_{1n}$ of the first datum surface 64, this may relate to the position of the one or more first datum points 66 from the first datum surface 64, as shown in the example of FIG. 5.

Once a determination has been made as to the position(s) $P_{1n}$ of the first datum surface 64 from the cutting insert 20 with respect to the predetermined reference position $P_0$, which may include calculating a spacing $S1_n$ (e.g. $S_{1a}$; $S_{1b} \ldots S_{1n}$) between each position(s) $P_{1n}$ of the first datum surface 64 and the predetermined reference position $P_0$, the methodology can then calculate whether the first datum surface 64 (and hence the position of each cutting edge 60) is correctly positioned/spaced with respect to the component 200 being machined, noting the predetermined reference position $P_0$ will be based off a known spacing S2 from the predetermined position $P_2$ from the component 200.

An incorrect position, or specifically an incorrect spacing $S1_n$ (e.g. $S_{1a}$; $S_{1b} \ldots S_{1n}$) between each position(s) $P_{1n}$ of the first datum surface 64 and the predetermined reference position $P_0$, in this respect will mean that the apparatus 10, when operated, will create splines 205 at an incorrect position and/or orientation in the component 200. In other words, an incorrect position/spacing is indicative of each cutting edge 60 being located at a wrong position and/or orientation with respect to the component 200 at the starting of the machining process.

If it is determined that the at least one position $P_{1n}$ of the first datum surface 64 from the cutting insert is correctly spaced/positioned with respect to the predetermined reference position $P_0$, the method requires no compensating for a difference in the at least one position of the first datum surface 64 with respect to the predetermined reference position $P_0$. However, if it is determined that the at least one position $P_{1n}$ of the first datum surface 64 from the cutting insert 20 is incorrect with respect to the predetermined reference position $P_0$ (e.g. because the cutting edge 60 and the first datum surface 64 was formed in a slightly incorrect position and/or orientation during the machining process of the cutting insert 20), to prevent any splines 205 being created in the wrong position and/or orientation on the component 200, the methodology may comprise compensating for a difference in the at least one position $P_{1n}$ of the first datum surface with respect to the predetermined reference position $P_0$, such to correctly space each position $P_{1n}$ of the first datum surface 64 with respect to the predetermined reference position $P_0$. In this way, and following such compensation, when the at least one spline 205 is then machined into the component 200, each spline 205 will then be positioned and orientated correctly on the component 200.

In terms of how the methodology may compensate for a difference in the at least one position $P_{1n}$ of the first datum surface 64 with respect to the predetermined reference position $P_0$, it will be appreciated that such compensating might comprise adjusting the position of the apparatus 10 and/or the cutting insert 20 with respect to the component 200 in such a way to ensure that the at least one position $P_{1n}$ of the first datum surface 64 from the cutting insert 20 is correctly spaced with respect to the predetermined reference position $P_0$, e.g. by adjusting the spacing $S1_n$ (e.g. $S_{1a}$; $S_{1b} \ldots S_{1n}$) between each position(s) $P_{1n}$ of the first datum surface 64 and the predetermined reference position $P_0$.

In accordance with some examples, such adjusting the position of the apparatus 10 (and the cutting insert 20) with respect to the component 200 may comprise moving at least one of the apparatus 10 and the component 200. In a particular example, it may be that the component 200 is fixed in place, such that any movement to compensate for a difference in the at least one position $P_{1n}$ of the first datum surface 64 with respect to the predetermined reference position $P_0$ may be achieved by solely varying the initial position and/or orientation of the apparatus 10.

Once any required compensation has been performed in terms of compensating for a difference in the at least one position $P_{1n}$ of the first datum surface 64 with respect to the predetermined reference position $P_0$, the method may then further comprise moving the apparatus 10, comprising the cutting insert 20 attached to the holder 15, with respect to the aeronautical component 200 to cut a first portion of material from the aeronautical component 200 using the at least cutting tooth 55 to create the at least one spline 205 in the aeronautical component 200.

In accordance with the above examples therefore, by forming the cutting insert 20 with the first datum surface 64 (or a datum point 66 therefrom) which is spaced from each cutting edge 60 (or a datum point 68 therefrom) by the correct respective predetermined spacing $S_1$, the provision of this first datum surface 64 facilities the above methodologies for creating splines 205 in the component 200 at a more correct position and orientation.

With regards to the geometry of the datum surface 64, it will be appreciated that this datum surface 64 may take a number of different forms, as required, so long as it is able to be used as a datum surface 64 from which a spacing measurement(s) $S1_n$ (e.g. $S_{1a}$; $S_{1b} \ldots S_{1n}$) from the predetermined reference positon $P_0$ can be made. In that respect therefore, in the example shown in FIGS. 4 and 5, the first datum surface 64 may comprise an external flat surface on the cutting insert 20.

Similarly, in accordance with some examples, to further improve the accuracy in being able to measure the spacing $S_{1A}$; $S_{1B}$ between the first datum surface 64 (or one or more datum points 66; $P_{1A}$; $P_{1B}$ therefrom) and the predetermined reference positon $P_0$, the first datum surface 64 may be polished, such to provide it with a smoother finish.

For the avoidance of any doubt, in examples where more than one cutting tooth 55 (and thus more than one cutting edge 60) is present on the cutting insert 20, it will be appreciated that the respective predetermined spacing $S_1$ between the first datum surface 64 and each cutting edge 60 may not be same for all the cutting edges 60 from the cutting insert 20. Accordingly, the predetermined spacing $S_1$ for one cutting edge 60 from the cutting insert 20 may be different to that of the predetermined spacing $S_1$ for another cutting edge 60 from the cutting insert 20.

In terms of how any given spacing $S_1$; $S_{1a}$; $S_{1b} \ldots S_{1n}$; $S_2$ might be measured or determined, it will be appreciated that this might be done in a number of different ways as required such as, but not limited to, optical means (e.g. a laser measuring system) provided on the apparatus, or via the use of a tool (e.g. a caliper).

Thus, there has been described an apparatus for machining at least one spline in an aeronautical component, the apparatus comprising a holder defining an axial direction about which the holder is moveable, and a cutting insert attachable to the holder, wherein the apparatus further comprises a coupling for attaching the cutting insert to the holder about a second direction that is perpendicular to the axial direction of the holder.

There has also been described an apparatus for machining at least one spline in an aeronautical component, the apparatus comprising a holder, and a cutting insert attachable to the holder, wherein the apparatus further comprises an coupling for attaching the cutting insert to the holder, wherein the apparatus comprises a first alignment feature for orientating the cutting insert at a single orientation with respect to the holder.

Also described is a cutting insert for machining at least one spline in an aeronautical component, the cutting insert comprising at least one cutting tooth, each cutting tooth comprising a cutting edge extending along a length direction of the cutting insert, wherein the cutting insert comprises at least one coupling extending about a width direction of the cutting insert, wherein the width direction is perpendicular to the length direction, wherein the coupling is configured to releasably attach the cutting insert to an apparatus for holding, and moving, the cutting insert for machining the at least one spline in the aeronautical component.

There has also been disclosed a method of machining at least one spline in an aeronautical component using an apparatus comprising a holder, and a cutting insert attached to the holder, wherein the cutting insert comprises at least one cutting tooth for cutting material from the aeronautical component, wherein the method comprises:

moving the apparatus with respect to the aeronautical component to cut a first portion of material from the aeronautical component using the at least cutting tooth to create the at least one spline; and moving the apparatus with respect to the aeronautical component and cutting a second portion of material from the aeronautical component to create a fillet or chamfer on an edge from the at least one spline.

In such a method, the at least one spline may be an internal spline, or an external spline, in the aeronautical component.

In such methods, the at least one spline may comprise a plurality of splines extending around a circumference of the aeronautical component, wherein the moving the apparatus with respect to the aeronautical component to cut a first portion of material from the aeronautical component using the at least cutting tooth to create the at least one spline further comprises:

cutting the aeronautical component using the at least cutting tooth to create a first spline from the plurality of splines; and cutting the aeronautical component using the at least cutting tooth to create a second spline from the plurality of splines;

cutting the aeronautical component using the at least cutting tooth to create a third spline from the plurality of splines;

wherein the third spline from the plurality of splines is positioned between the first spline and the second spline, and is created after the creation of the first spline and the second spline.

There has also been disclosed a spline forming apparatus comprising a tool holder for a multi-axis cutting machine, said tool holder comprising a coupling arranged in use to receive a cutting insert, wherein the cutting insert has a cutting surface geometry corresponding to a desired spline geometry.

Also described herein are the examples set out in the following clauses.

Clause 1. An apparatus for machining at least one spline in an aeronautical component, the apparatus comprising a holder defining an axial direction about which the holder is moveable, and a cutting insert attachable to the holder, wherein the apparatus further comprises a coupling for attaching the cutting insert to the holder about a second direction that is perpendicular to the axial direction of the holder.

Clause 2. An apparatus according to clause 1, wherein the coupling comprises a slot extending in the second direction, and which extends through one of the cutting insert and the holder; and an elongate member connected to the other of the cutting insert and the holder, wherein the elongate member is passable in the second direction through the slot for attaching the cutting insert to the holder.

Clause 3. An apparatus according to any preceding clause, wherein the apparatus comprises a first alignment feature for orientating the cutting insert at a single orientation with respect to the holder.

Clause 4. An apparatus according to clause 3, wherein the first alignment feature comprises a recess, in the holder, and in which the cutting insert is located when the cutting insert is attached to the holder.

Clause 5. An apparatus according to clause 3 or 4, wherein the first alignment feature comprises a first shoulder on the holder, wherein the cutting insert is located against the first shoulder when the cutting insert is attached to the holder.

Clause 6. An apparatus according to clause 5, wherein the first alignment feature comprises a second shoulder on the holder, wherein the cutting insert is located against the second shoulder when the cutting insert is attached to the holder, and wherein the second shoulder is perpendicular to the first shoulder.

Clause 7. An apparatus according to any preceding clause, wherein the holder comprises a plurality of coolant outlets for the passage of coolant fluid from the holder towards the aeronautical component, wherein the cutting insert when attached to the holder via the coupling is positioned between a first coolant outlet and a second coolant outlet from the plurality of coolant outlets.

Clause 8. An apparatus according to any preceding clause, wherein the cutting insert comprises at least one cutting tooth.

Clause 9. An apparatus according to clause 8, wherein each cutting tooth comprises a cutting edge extending along a length direction of the cutting insert, wherein the second direction is perpendicular to the length direction of the cutting insert.

Clause 10. A cutting insert according to clause 8 or 9, wherein the at least one cutting tooth comprises a plurality of cutting teeth.

Clause 11. An apparatus according to any preceding clause, wherein the holder comprises a first axial end, and a second axial end opposite the first axial end, wherein the cutting insert when attached to the holder is located between the first axial end and the second axial end.

Clause 12. An apparatus according to clause 11, wherein the holder comprises a narrowing portion extending from the first axial end towards the second axial end, wherein the maximum width of the holder in the narrowing portion decreases from the second axial end towards the first axial end, and wherein the cutting insert when attached to the holder is located in the narrowing portion of the holder, wherein the width direction of the holder is perpendicular to the axial direction of the holder.

Clause 13. An apparatus according to any preceding clause, wherein the apparatus further comprises a rotatable member which is attached to the holder, wherein the rotatable member is rotatable about a first axis of rotation, and rotatable about a second axis of rotation which is not parallel to the first axis of rotation.

Clause 14. An apparatus according to clause 13, wherein the apparatus further comprises a second alignment feature between the rotatable member and the holder for orientating the holder at a single orientation with respect to the rotatable member.

Clause 15. An apparatus according to any preceding clause, wherein the apparatus is configured to allow the cutting insert, when attached to the holder, to be moved about 5 axes of movement.

Clause 16. An apparatus according to any preceding clause, further comprising the cutting insert attached to the holder via the coupling.

Clause 17. An apparatus for machining at least one spline in an aeronautical component, the apparatus comprising a holder, and a cutting insert attachable to the holder, wherein the apparatus further comprises a coupling for attaching the cutting insert to the holder, wherein the holder comprises a first alignment feature for orientating the cutting insert at a single orientation with respect to the holder.

Clause 18. An apparatus according to any preceding clause, wherein the apparatus further comprises an edge breaking tool.

Clause 19. An apparatus according to any preceding clause, wherein the apparatus is a spline machining apparatus.

Clause 20. A cutting insert for machining at least one spline in an aeronautical component, the cutting insert comprising at least one cutting tooth, each cutting tooth comprising a cutting edge extending along a length direction of the cutting insert, wherein the cutting insert comprises at least one coupling extending about a width direction of the cutting insert, wherein the width direction is perpendicular to the length direction, wherein the coupling is configured to releasably attach the cutting insert to an apparatus for holding, and moving, the cutting insert for machining the at least one spline in the aeronautical component.

Clause 21. A method of machining at least one spline in an aeronautical component using an apparatus according to any of clause 1 to 19.

Clause 22. A method of machining at least one spline in an aeronautical component using the cutting insert of clause 20.

Clause 23. A method of machining at least one spline in an aeronautical component using an apparatus comprising a holder, and a cutting insert attached to the holder, wherein the cutting insert comprises at least one cutting tooth for cutting material from the aeronautical component, wherein the method comprises:

moving the apparatus with respect to the aeronautical component to cut a first portion of material from the aeronautical component using the at least cutting tooth to create the at least one spline; and moving the apparatus with respect to the aeronautical component and cutting a second portion of material from the aeronautical component to create a fillet or chamfer on an edge from the at least one spline.

Clause 24. A method according to clause 23, wherein the at least one spline is an internal spline in the aeronautical component.

Clause 25. A method according to clause 23 or 24, wherein the at least one spline comprises a plurality of splines extending around a circumference of the aeronautical component, wherein the moving the apparatus with respect to the aeronautical component to cut a first portion of material from the aeronautical component using the at least one cutting tooth to create the at least one spline further comprises:

cutting the aeronautical component using the at least one cutting tooth to create a first spline from the plurality of splines; and cutting the aeronautical component using the at least one cutting tooth to create a second spline from the plurality of splines;

cutting the aeronautical component using the at least one cutting tooth to create a third spline from the plurality of splines;

wherein the third spline from the plurality of splines is positioned between the first spline and the second spline, and is created after the creation of the first spline and the second spline.

Clause 26. A spline forming apparatus comprising a tool holder for a multi-axis cutting machine, said tool holder comprising a coupling arranged in use to receive a cutting insert, wherein the cutting insert has a cutting surface geometry corresponding to a desired spline geometry.

Clause 27. An apparatus according to clause 26, wherein the cutting insert is provided with a cutting surface geometry corresponding to a pair of adjacent splines.

Clause 28. An apparatus according to clause 26 or 27, wherein the multi-axis cutting machine is a 5 axis computer numerically controlled milling machine.

Clause 29. A multi-axis milling machine comprising an apparatus according to any of clauses 26 to 28.

Clause 30. A method of operating a multi-axis milling machine according to clause 29, said method comprising the steps of:

(A) reciprocating the tool holder and cutting insert along an axis of the machine to form one or more splines in a part to be machined;

(B) rotating the part to be machined with respect to the multi-axis milling machine by a predetermined angle; and (C) repeating steps (A) and (B) until a predetermined number of splines have been formed around the part.

In terms of the apparatuses and methods described herein, it will be appreciated that a number of modifications could be made thereto, as would be appreciated by the skilled person.

For instance, although the apparatuses and methods have been described as being for use in creating splines in an aeronautical component (which require narrow dimensional tolerances), the apparatuses and methods may equally be used to create any other component, and/or feature(s) therefrom. Possible components include automotive, or naval, components, or components used in a gear assembly.

In addition, whilst the apparatus 10 preferably comprises a coupling 25 for attaching the cutting insert 20 to the holder 15 about a second direction A2 that is perpendicular to the axial direction A1 of the holder 15, for the reasons outlined above, in other more general examples the second direction A2 might not be perpendicular to the axial direction A1. In such examples, the second direction A2 might be orientated at any angle with respect to the axial direction A1, or in other examples may be orientated such that it is not parallel to the axial direction A1.

The invention claimed is:

1. An apparatus for machining at least one spline in an aeronautical component, the apparatus comprising:
a holder defining an axial direction about which the holder is moveable;
a cutting insert attachable to the holder;
a first alignment feature for orientating the cutting insert at a single orientation with respect to the holder;
the cutting insert comprising a cutting tooth, the cutting tooth comprising a cutting edge, and the cutting insert further comprising a first datum surface which is spaced from the cutting edge by a respective predetermined spacing; and
a coupling for attaching the cutting insert to the holder about a second direction that is perpendicular to the axial direction of the holder.

2. The apparatus according to claim 1, wherein the first datum surface comprises an external flat surface on the cutting insert.

3. The apparatus according to claim 1, wherein the coupling comprises a slot extending in the second direction, and which extends through one of the cutting insert and the holder; and an elongate member connected to the other of the cutting insert and the holder, wherein the elongate member is passable in the second direction through the slot for attaching the cutting insert to the holder.

4. The apparatus according to claim 1, wherein the first alignment feature comprises a recess in the holder, and in which the cutting insert is located when the cutting insert is attached to the holder.

5. The apparatus according to claim 1, wherein the first alignment feature comprises a first shoulder on the holder, wherein the cutting insert is located against the first shoulder when the cutting insert is attached to the holder.

6. The apparatus according to claim 5, wherein the first alignment feature comprises a second shoulder on the holder, wherein the cutting insert is located against the second shoulder when the cutting insert is attached to the holder, and wherein the second shoulder is perpendicular to the first shoulder.

7. The apparatus according to claim 1, wherein the holder comprises a plurality of coolant outlets for passage of coolant fluid from the holder towards the aeronautical component, wherein the cutting insert when attached to the holder via the coupling is positioned between a first coolant outlet and a second coolant outlet of the plurality of coolant outlets.

8. The apparatus according to claim 1, wherein the cutting tooth is machined into the cutting insert.

9. The apparatus according to claim 1, wherein the cutting edge extends along a length direction of the cutting insert, wherein the second direction is perpendicular to the length direction of the cutting insert.

10. The apparatus according to claim 1, wherein the holder comprises a first axial end, and a second axial end opposite the first axial end, wherein the cutting insert when attached to the holder is located between the first axial end and the second axial end.

11. The apparatus according to claim 10, wherein the holder comprises a narrowing portion extending from the first axial end towards the second axial end, wherein a maximum width of the holder in the narrowing portion decreases from the second axial end towards the first axial end, and wherein the cutting insert when attached to the holder is located in the narrowing portion of the holder, wherein a width direction of the holder is perpendicular to the axial direction of the holder.

12. The apparatus according to claim 1, further comprising a rotatable member attached to the holder, wherein the rotatable member is rotatable about a first axis of rotation and rotatable about a second axis of rotation which is not parallel to the first axis of rotation.

13. The apparatus according to claim 12, further comprising a second alignment feature between the rotatable member and the holder for orientating the holder at a single orientation with respect to the rotatable member.

14. The apparatus according to claim 1, wherein the apparatus is configured to allow the cutting insert, when attached to the holder, to be moved about at least 4 axes of movement.

15. The apparatus according to claim 1, wherein the cutting insert is attached to the holder via the coupling.

16. The apparatus according to claim 1, wherein the apparatus is configured to perform the steps of:

determining the position of the first datum surface from the cutting insert with respect to a predetermined reference position;

determining whether the first datum surface of the cutting insert is correctly positioned with respect to the predetermined reference position; and i) if it is determined that the first datum surface of the cutting insert is correctly positioned with respect to the predetermined reference position, then machining the at least one spline into the aeronautical component; or otherwise ii) if it is determined that the first datum surface from the cutting insert is incorrectly positioned with respect to the predetermined reference position, then making a compensation to correctly position the first datum surface of the cutting insert with respect to the predetermined reference position, and then following the compensation machining the at least one spline into the aeronautical component.

\* \* \* \* \*